United States Patent [19]

Kordomenos et al.

[11] Patent Number: 4,588,787

[45] Date of Patent: May 13, 1986

[54] FLEXIBLE TWO COMPONENT URETHANE COATING COMPOSITIONS

[75] Inventors: Panagiotis I. Kordomenos, Mt. Clemens; Kenneth R. Kurple, Anchorville; Delores J. Alexander, Southfield, all of Mich.

[73] Assignee: Ford Motor Company, Dearborn, Mich.

[21] Appl. No.: 558,399

[22] Filed: Oct. 13, 1983

[51] Int. Cl.$^4$ ................. C08F 20/00; C08L 75/06
[52] U.S. Cl. .................... 525/440; 525/454; 525/457
[58] Field of Search ............. 525/440, 454, 457

[56] References Cited

U.S. PATENT DOCUMENTS

| | | |
|---|---|---|
| 3,012,987 | 12/1961 | Ansul . |
| 3,763,079 | 10/1973 | Fryd . |
| 3,882,189 | 5/1975 | Hudak . |
| 3,954,899 | 5/1976 | Chang et al. . |
| 3,962,369 | 6/1976 | Chang et al. ............ 525/440 |
| 3,962,522 | 6/1976 | Chang et al. . |
| 4,017,456 | 4/1977 | Tucker et al. . |
| 4,034,017 | 7/1977 | Chang et al. . |
| 4,134,873 | 1/1979 | Diaz et al. . |
| 4,205,115 | 5/1980 | Piccirilli et al. . |
| 4,208,495 | 6/1980 | Chang et al. . |
| 4,235,977 | 11/1980 | Frisch et al. . |
| 4,420,601 | 12/1983 | Kuroda et al. . |

Primary Examiner—John C. Bleutge
Assistant Examiner—A. L. Carrillo
Attorney, Agent, or Firm—Lorraine S. Melotik; Roger L. May

[57] ABSTRACT

This invention relates to flexible coating compositions which have excellent adherence to metal or plastic and possess superior weathering properties. More particularly, the invention relates to coating compositions which comprises hydroxy-containing urethane modified polyesters. The modified polyesters are made from urethane modified diols reacted with polyol and diacid compounds, polyisocyanate crosslinking agent and, optionally, a high molecular weight linear polyurethane.

15 Claims, No Drawings ns", both to Kordomenos et al.

FLEXIBLE TWO COMPONENT URETHANE COATING COMPOSITIONS

Reference is made to concurrently filed and commonly assigned related U.S. application Ser. No. 553,322 entitled "Flexible Coating Compositions", now U.S. Pat. No. 4,524,192, and U.S. application Ser. No. 592,124 entitled "Flexible Basecoat/Clearcoat Coating Compositions", now U.S. Pat. No. 4,533,704, both to Alexander et al, U.S. application Ser. No. 555,463 entitled "Flexible Basecoat/Two Component Clearcoat Compositions", abandoned in favor of CIP application Ser. No. 615,700 filed May 29, 1984, now U.S. Pat. No. 4,533,703, and U.S. application Ser. No. 598,551, now U.S. Pat. No. 4,530,976, entitled "Flexible Uni-Basecoat/Two Component Clearcoat Coating Compositions", both to Kordomenos et al.

TECHNICAL FIELD

This invention relates to flexible coating compositions which have excellent adherence to metal or plastic and possess superior weathering properties. More particularly, the invention relates to coating compositions which comprises hydroxy-containing urethane modified polyesters made from urethane modified diols reacted with polyol and diacid component, polyisocyanate crosslinker, and, optionally, a high molecular weight linear polyurethane.

BACKGROUND ART

Recently, there has been interest in the use of rubbery, resilient materials for areas which are subject to mechanical shock such as automobile bumpers, moldings and front ends. The use of such materials aids in providing protection from permanent structural damage but, in order to attain the desired appearance, a protective coating must have unique properties, such as a high degree of extensibility, impact resistance, resistance to cracking under severe environmental conditions, such as exposure to low temperature and low humidity. Conventional coatings, including those employed on rubber and similar extensible objects heretofore, do not have the required combination of properties. Generally compositions that are flexible enough to be applied over both metal and plastic substrates have rather poor weatherability and overall durability.

U.S. Pat. No. 3,882,189 and U.S. Pat. No. 3,962,522 are exemplary of numerous patents which describe flexible coating compositions wherein the resin comprises polyurethane modified polyesters formed by reacting polyisocyanate with polyester polyols. These resins are cured with amine-aldehyde crosslinkers. It is taught therein, that the presence of the urethane groups in the polymer significantly contributes to the flexibility as well as improved weathering properties, gloss, and abrasion resistance of the coating. However, while it is thus desirable to employ a substantial number of urethane groups in these resins, the amount which may be included in these types of resins is limited. When hydroxy polyester resin is reacted with polyisocyanate it has a tendency to form a gelled mass and thus the amount of polyisocyanate that may be employed must be restricted in order to avoid gelation. Still further, these urethane linkages are added in a latter modification of the polyester polyol reaction product, rather than being incorporated into the backbone of the resin.

DISCLOSURE OF THE INVENTION

This invention is directed to flexible two component coating compositions which are suitable for use over various substrates, including rubbery resilient materials as well as metal. The coating composition of this invention is characterized in that the composition comprises:

(A) hydroxy-containing urethane modified polyester (i) having a number average molecular weight ($\overline{M}_n$) of between about 1000 and about 10,000, (ii) having a hydroxyl number of between about 30 and about 200, and (iii) containing between about 1 and about 10 urethane groups per molecule, and being made from reactants comprising:

(1) urethane modified diol made by reacting:
 (a) diol, and
 (b) diisocyanate, wherein the diol and diisocyanate are reacted in a molar ratio of from about 4:1 to about 4:3;

(2) polyol comprising at least about 5 weight percent triol; and (3) acid component selected from dicarboxylic acids and anhydrides thereof;

(B) polyisocyanate crosslinking agent; and (C) 0–60 weight percent, based on the total weight of (A) and (B), of a linear polyurethane having a number average molecular weight of between about 15,000 and about 40,000, preferably between about 20,000 and about 30,000.

These coatings may be employed, e.g., as finish automotive coatings or as automotive primer coats.

Advantageously, the flexible coatings of the invention of this application possess superior weathering properties as well as excellent adhesion to metal and plastic, thus making them well suited for use as coatings on various car components. In forming the modified polyester of the coatings of the invention of this application, the urethane linkages are advantageously incorporated into the backbone of the modified polyester, since they are formed in an initial reaction of diisocyanate with diol, rather than being incorporated into the polyester resin in a later reaction step as is done when forming prior art urethane polyester resins. It has now been found that the initial incorporation of the urethane linkage into the backbone of the modified polyester allows the formation of more flexible coatings with improved properties, when compared to the prior art coatings discussed above.

Still further, the ability to use of the same coating compositions on metal and plastic components in car production offers distinct commercial advantages, particular in terms of production efficiency. Additionally, because these coatings can be employed on metal as well as plastic components, the problem of color matching, which must be resolved when using a different coating on the metal and plastic, is eliminated.

BEST MODE FOR CARRYING OUT THE INVENTION

This invention is directed to flexible coating compositions which comprise novel hydroxy-containing urethane modifying polyester crosslinkable with polyisocyanate crosslinking agent. This coating composition may be employed as a pigmented coating or as a clearcoating on the substrate.

The novel hydroxy-containing urethane modified polyester of the coating composition of this invention has a number average molecular weight ($\overline{M}_n$) of between about 1000 and about 10,000, preferably between about 2000 and about 4000. This modified polyester has a hydroxyl number of between about 30 and about 200, preferably between about 50 and about 120. It also contains between about 1 and about 10 urethane groups per molecule. One of the reactants used to form the hydroxy-containing urethane modified polyester is a urethane modified diol which is made by reacting diol and diisocyanate. In forming this urethane modified diol, the diol and the diisocyanate are reacted in a molar ratio of from about 4:1 to about 4:3, preferably in a molar ratio of from about 2:0.8 to about 2:1.2, most preferably in a molar ratio of about 2:1. The diols employed in making the urethane modified diol include, but are not limited to, alkylene glycols, such as butylene glycol, neopentyl glycol, 1,5,pentene glycol, 3-cyclohexene-1,1-dimethynol, and other glycols such as hydrogenated bisphenol A, caprolactone diol (i.e., the reaction product of caprolactone and ethylene glycol), hydroxy alkylated bisphenols, polyether glycols, e.g., poly(oxytetramethylene) glycol, polyester diols, e.g., 2,2-dimethyl-3-hydroxypropyl-2,2-dimethyl-3-hydroxypropionate, and the like. Preferred diols are neopentyl glycol and 2,2-dimethyl-3-hydroxypropyl-2,2-dimethyl-3-hydroxypropionate, the latter material being commercially available as Esterdiol 204 (a trademark of and available from Union Carbide Corp., New York, N.Y.). While a number of types of diols have been mentioned above as suitable for use as the diol component in making the urethane modified diol of this invention, their disclosure is not meant to be limiting. A great many diols are known in the art. Selection of other diols which would be suitable for use in forming the urethane modified diol would be well within the skill of those in the art. Mixtures of diols may also be employed in making the urethane modified diol.

The diisocyanate employed in making the urethane modified diol may be essentially any diisocyanate. Many such organic diisocyanate are known in the art. Suitable diisocyanates include hydrocarbon diisocyanate or substituted hydrocarbon diisocyanate, such as 1,6-hexamethylene diisocyanate, isophorone diisocyanate, p-phenylene diisocyanate, biphenyl diisocyanate, toluene diisocyanate, and 3,3-dimethyl-4,4-biphenylene diisocyanate. While the diisocyanate may be any of a number of aliphatic, cycloaliphatic, and aromatic diisocyanates, it is preferred that the diisocyanate be an aliphatic diisocyanate, such as 4,4-dicyclohexylmethane-diisocyanate. As would be apparent to those skilled in the art, mixtures of various diisocyanates may also be employed at the diisocyanate component used in forming the urethane-modified diol.

The polyol component used in forming the hydroxy-containing urethane modified polyester comprises at least about 5 weight percent triol based on the weight of the polyol component. Preferred triols are conventional low molecular triols such as 1,2,6-hexene triol, 1,1,1-trimethylol propane, pentaerythritol, 3-(2-hydroxypropoxy)-1,2-propanediol and polycaprolactone triols, which are commercially available as, for example, PCP-301 (Trademark of Union Carbide Corp., New York, N.Y.). This polyol component may also comprise, in addition to the triol, other polyol material such as diols or tetrols. Preferably, however, these other polyols, when employed, consist of diols. Examples of suitable diols which may be included in the polyol component are those which have been disclosed above as suitable for forming the urethane modified diol. Preferred diols for use in the polyol component are linear aliphatic diols. While the polyol component may comprise materials such as a diol in addition to the triols, the polyol component may consist essentially of triols. By employing diols in the polyol component in addition to the triols, the flexibility of the coating composition is generally increased. Thus selection of the polyol component to be used in forming the hydroxy-containing urethane modified polyester will be dependent on the particular desired properties and application of the coating composition. When diols are employed in the polyol component, the polyol preferably comprises from about 10 to about 80 weight percent triols and from about 90 to about 20 weight percent diols.

The acid component which is used to form urethane modified polyesters of the composition may be selected from aliphatic, aromatic, cycloaliphalic dicarboxylic acids or anhydrides thereof. Preferred dicarboxylic acid are the $C_6$-$C_{12}$ acids, which include adipic, azelaic, sebasic, or dodecane dicarboxylic acid, or cyclohexanedicarboxylic acid. More preferably, the dicarboxylic acids are aliphatic dicarboxylic acid, most preferably also being linear. Mixtures of suitable acids and/or their anhydrides may also be used as the acid component in this invention.

In forming the coating composition of this invention the diol (a) and the diisocyanate (b) described above are combined and reacted, generally at an elevated temperature, so as to form the urethane modified diol. The ratio of the diol to diisocyanate (i.e., a molar excess of diol) has been chosen so that at the completion of this reaction no free isocyanate groups are present; the isocyanate having been incorporated into a hydroxy functional material. This urethane modified diol is then combined and reacted with the polyol and acid components, generally in the presence of a catalyst and at elevated temperatures, so as to effect formation of a hydroxy containing urethane modified polyester. Suitable catalysts for the carboxy/hydroxy condensation reaction include such catalysts as tetraisopropyl titanate, strong acids such as p-toluene sulfonic acid, phosphoric acid, sulfuric acid and materials such as zinc oxide, antimony oxide ($Sb_2O_3$) and sodium acetate. Other catalysts will be apparent to those skilled in the art.

The reactions, whereby the hydroxy-containing urethane modified polyester are formed, are generally carried out in the presence of solvents commonly employed in paint formulations such as toluene, xylene, methyl amyl ketone, etc.

The other essential component of the coating composition of the invention is polyisocyanate crosslinking agent, i.e., a compound having 2 or more, preferably 3 or more, reactive isocyanate groups per molecule. These polyisocyanate materials function as a cross-linking agent in the composition of the invention by reacting with the hydroxy functionality of the hydroxy-containing modified polyester (A) and by reaction with the hydroxy functionality on the linear polyurethane (C), if such linear polyurethane is included in the composition. This polyisocyanate crosslinking agent is generally included in the compositions of the invention in an amount of between about 5 to about 60 weight percent, preferably between about 20 and about 40 weight percent based on the weight of the hydroxy-containing urethane modified polyester of the composition. Selection of the optimal amount of polyisocyanate crosslinking agent to be employed in the coating composition is dependent on the desired properties (e.g., flexibility) as well as its intended use and selection of such amount would be within the skill of one in the art.

Polyisocyanates are well known in the art and numerous suitable organic isocyanates having 2 or more reactive isocyanate groups per molecule will be apparent to those skilled in the art. Among the many suitable polyisocyanates are aliphatic, cycloaliphatic and aromatic isocyanage compounds. Representative of the numerous isocyanates which may be employed are (1) aliphatic diisocyanates such as trimethylene diisocyanate, tetramethylene diisocyanate, pentamethylene diisocyanate, hexamethylene diisocyanate, 1,2 propylene diisocyanate, 1,2 butylene diisocyanate, 2,3 butylene diisocyanate, 1,3 butylene diisocyanate, ethylidene diisocyanate, butylidene diisocyanate, 4,4'bis(isocyanate hexyl)methane bis(2-isocyanate-ethyl)fumarate, 2,6-diisocyanate methyl caproate, 2,2,4(2,4,4)-trimethylhexamethylene diisocyanate, and dimer acid diisocyanates; (2) cycloaliphatic diisocyanates such as 1,3 cyclopentane diisocyanate, 1,4 cyclopentane diisocyanate, 1,2 cyclopentane diisocyanate, and methylcyclohexylene diisocyanate; (3) aromatic diisocyanates such as m-phenylene diisocyanate, p-phenylenediisocyanate, 4,4' diphenyl diisocyanate, i.5 methylene diisocyanate, 1,4 naphalene diisocyanate; (4) aliphatic/aromatic diisocyanates such as 4,4' diphenylene methane diisocyanates, 2,4 or 2,6 tolylene diisocyanate, 4,4'toluidene diisocyanate, 1,4 xylylene diisocyanate; (5) nuclear substituted aromatic compounds such as dianisidine diisocyanate, 4,4'diphenylether diisocyanate, chlorodiphenylene diisocyanate; (6) triisocyanates such as triphenylmethane 4,4',4,4" triisocyanate, 1,3,5 tri-isocyanate benzene, 2,4,6 triisocyanate toluene; (7) tetraisocyanates such as 4,4' diphenyl dimethylmethane 2,2',5,5' tetraisocyanate; (8) polymerized isocyanates such as tolylene diisocyanate dimers and trimers and the like; and (9) polyisocyanates such as prepolymers derived from polyol, including polyether polyols or polyester polyols (including polyethers which are reacted with excess polyisocyanates to form isocyanate terminated prepolymers), simple polyols such as glycols (e.g., ethylene glycol, propylene glycol), other polyols such as glycerol, trimethylol propane, hexane triol, pentaerythritol and the like, as well as monoethers, e.g., diethylene glycol, tripropylene glycol and the like and polyethers, i.e., alkylene oxide condensates of the above. While the polyisocyanate crosslinking agent may be any organic polyisocyanate, as has been detailed above, such crosslinking agents for coating compositions to be employed as topcoats are preferably aliphatic or cycloaliphatic polyisocyanates, due to their superior weatherability. For primer applications, aromatic aliphatic diisocyanates are suitable.

Especially preferred for use in the compositions of the invention are trimerized products of aliphatic diisocyanates such as 1,6 hexamethylene diisocyanate. Still another particularly preferred type of crosslinking agent is a polyisocyanate having a biuret structure. This type of polyisocyanate is well known as are methods for making the same. One such polyisocyanate crosslinking agent is a high molecular weight biuret of 1,6 hexamethylene diisocyanate sold by Mobay Chemical Company under the trademane Desmodur N. Exemplary of other biuret type polyisocyanates are those prepared in accordance withe U.S. Pat. No. 3,976,622 to Wagner et al.

OPTIONAL MATERIALS

Additional materials which may be employed in the coating composition of this invention include a high molecular weight linear polyurethane which has a number average molecular weight of between about 15,000 and about 40,000, preferably between about 20,000 and about 30,000. It may be made by reacting one of the above mentioned diisocyanates and diols, such as oligoester diol, polycaprolactone diol, polyoxypropylene diol, polyether diols, etc. Suitable high molecular weight linear polyurethane materials are commercially available, for example, as Spenlite L06-30S, (available from and a trademark of Spencer-Kellogg, Buffalo, N.Y.). The high molecular weight polyurethane may be employed in the composition in amounts up to about 60 weight percent based on the total weight of the hydroxy-containing urethane modified polyester and polyisocyanate crosslinking agent. When employed, it is preferred that they be included in the composition in amounts of between about 10%-60%, more preferably in amounts of about 30%-50% by weight as described. Selection of the optimal amount of linear polyurethane to be employed in the coating composition would be dependent on the particular properties and application of the coating composition desired and will be within the skill of those in the art.

In addition to the above discussed components, other materials may be included in the coating composition of this invention. These include materials such as catalysts, antioxidants, U.V. absorbers, solvents, surface modifiers and whitening agents as well as pigments. Solvents used in the coating composition of this invention are those which are commonly used, e.g., to facilitate spray application of high solids content and include toluene, xylene, methylethyl ketone, acetone, 2-ethoxy-1-ethanol,2-etoxyl-1,ethanol, diacetone alcohol, tetrahydrofuran, ethyl acetate, dimethylsuccinate, dimethylglutarate, dimethyladipate or mixtures thereof. The solvent in which the hydroxy-containing urethane modified polyester is prepared may be employed as a solvent for the composition thus eliminating the need for drying the resin after preparation, if such is desired.

Typical of the ultraviolet stabilizers that are useful in this invention are benzophenones such as dodecyl oxibenzophenone, 2,4-dihydroxybenzophenone,hydroxybenzophenones containing sulfonic groups, 2-4-dihydroxy-3'5'-ditertiary butyl benzophenone, 2,2',4',trihydroxy benzophenone esters of dicarboxylic acids, 2-hydroxy-4-acryloxyethoxybenzophenone, aliphatic mono esters of 2,2',4-trihydroxy-4'alkoxybenzophenone; 2-hydroxy-4-methoxy-2-carboxybenzophenone; triazoles such as 2-phenyl-4-(2'4'-dihydroxybenzoyl)-triazoles substituted benzotriazoles such as hydroxyphenyltriazoles such as 2-(2'hydroxy-5'-methylphenyl)-benzotriazole, 2-(2'-hydroxy-phenyl)benzotriazole, 2-(2'hydroxy-5'-octylphenyl)naphthiotriazole. Another type of ultralight stabilizer and one that is particularly preferred for use in the coatings of this invention comprise those taught in concurrently filed U.S. application Ser. No. 553,321, which issued as U.S. Pat. No. 4,480,084 entitled "Polymeric Light Stabilizers" to Kordomenos et al. These stabilizers contain the sterically hindered polyalkylpiperidine radical and at least two primary hydroxyl groups available for crosslinking with the polyisocyanate component of the coating composition.

Typical of the antioxidants which may be employed in the coating composition include tetrakis alkylene (di-alkyl hydroxy aryl) alkyl ester alkanes such as tetrakis methylene 3(3',5'-dibutyl-4'hydroxyphenyl)proprionate methane, reaction product of p-amino diphenylamine and glycidyl methacrylate, reaction product of n-hexyl-N'-phenylamine diamine and glycidyl methacrylate, pentaerythritol tetrakis(thioglycolate), trimethylol propane tris(thioglycolate), trimethylol ethane tris(thioglycoate), N-(4-anilino phenyl)acrylamide, N-(4-anilinophenyl)maleamic acid N-(4-anilinophenyl) maleimide, alkylhydroxyphenyl groups bonded through carboalkoxy linkages to nitrogen atom of a heterocyclic nucleus containing an imidodicarbonyl group or an inidodithiocarbonyl group, 3,3diterт, butyl-4-hydroxy cinnamonitrile, ethyl 3,5-ditert,hexyl-4-hydroxycinnamate, substituted benzyl esters of B-substituted hydroxy phenyl) propionic acids, bis(hydroxyphenyl alkylene) alkyl isocyanurate compounds, tetrakis hydroxy benzyl phosphonium halides alone or in combination with a dialkylthiodialkanoate, thioeimethylidyne tetrakisphenols alone or in combination with a dialkyl thiodialkanoate or phosphite or phosphonate, dihydrocarbyl-hydroxy phenyl aryl or alkyl phosphonites or phosphonates or phosphates or phosphites or phosphinates or phosphionites or phisphorothionates or phosphinothionates, diphenyl bis(3,5-dietert-butyl-4-hydroxy)silane, hydrocarbylhydroxyphenyl-dihydrocarbyldithio-carbamates such as 3,5di-tert-butyl-4-hydroxy phenyl dimethyldithio carbamate and amino benzyl thioether.

In those applications wherein the coating composition is used as a single finish coating on a substrate, it would preferably include the combination of a benzotriazole such as Tinuvin 328 (a trademark of and commercially available from Ciba-Geigy, Ardsley, N.Y.), and the hindered polymeric amine of the concurrently filed application noted above, and an antioxidant, such as Irganox-1010 (a trademark of and available from Ciga-Geigy). While several applications of the coating composition have been proposed, e.g., as primers, clearcoats, pigmented coatings, etc., they are not meant to be limiting. Additionally, while preferred embodiments of stabilizers and antioxidants have been taught, they are not meant to be limiting.

Surface modifiers or wetting agents are common additives for liquid paint compositions. Exact mode of operation of these surface modifiers is not known but it is thought that their presence contributes to better adhesion of coating compositions to the surface being coated and helps formation of thin coatings, particularly on metal surfaces. The choice of surface modifiers or wetting agents is dependent upon the type of surface to be coated. Selection of appropriate surface modifiers will be well within the skill of the artesian. Typical of these surface modifiers are polybutyl acrylate and a wide variety of silicon wetting agents which are commercially available.

For many applications of the coating compositions of the invention, particularly high solids compositions, it may be desirable to employ flow control additives to provide sag free coatings. Among numerous such materials NAD's such as described by Porter (S. Porter, Jr., and B. N. McBane, U.S. Pat. No. 4,025,474, May 24, 1977) are compatible with these coating compositions. These particle dispersions may be included generally in an amount up to 15% by weight of the total composition. Other types of NAD's such as described by D. L. Maker and S. C. Peng (U.S. Pat. No. 3,814,721, June 4, 1974) or by S. K. Horvath (U.S. application Ser. No. 292,853, filed Aug. 14, 1981, now U.S. Pat. No. 4,415,681) also may be included in the coating composition.

The coating composition of the invention may also include pigments. The optimal amount of pigment which may be included in the coating composition would be dependent on the particular use of the coating composition, desired color, hiding requirement of the coating, etc., as would be apparent to one skilled in the art.

The coating composition can be applied by conventional methods known to those in the art. These methods include roll coating, spray coating, dipping or brushing and of course the particular application technique chosen with the particular substrate to be coating and the environment in which coating operation takes place.

Particular preferred techniques for applying these coating compositions, particularly when applying the same to automobiles, is spray coating through the nozzle of the spray gun. In spray applying the coating composition, the hydroxy-containing urethane modified polyester and the optional linear polyurethane along with other additives such as pigments, U.V. absorbers, antioxidants and other nonreactive materials are admixed with a solvent. These materials are fed as one component of a two component system into a spray gun which combines the materials as they are sprayed onto the automotive substrate. The other material is the polyisocyanate crosslinking agent, which may or may not be cut with a suitable nonreactive solvent.

INDUSTRIAL APPLICABILITY

It will be apparent from the foregoing that this invention has industrial applicability to automotive vehicles and provides a flexible, durable coating for metal and plastic substrates.

The invention will be further understood by referring to the following detailed examples. It should be understood that the specific examples are presented by way of illustration and not by way of limitation. Unless otherwise specified, all references to "parts" is intended to mean parts by weight.

EXAMPLE I

In a suitable reactor 562 gms of Esterdiol-204 (trademark of Union Carbide), 360 gms of xylene were charged. The mixture was brought to 149° C. and any water present was stripped out. The temperature was lowered to 93° C. and 360 gms of Desmondur W (trademark of Mobay Chemical co., Pittsburgh, Pa.) were added dropwise in a period of one hour. After the end of the addition, the mixture was postreacted at 93° C. until no NCO group was observed in an infrared spectrum. At this point, 240 gms of PCP-0301 (polycaprolactone triol, trademark of Union Carbide) 263 gms of adipic acid, 3 gms of dibutyl tin oxide, and 215 gms of xylene were added. The mixture was heated up to 204° C. and water was distilled off until the acid number dropped below 10. The batch was then thinned with 480 parts of methyl amyl ketone. The final product had $Z_3$ viscosity at 70.8% NV and acid number 1.2.

EXAMPLE II

In a suitable reactor 562 gms of Esterdiol-204 (trademark of Union Carbide) and 360 gms of xylene were charged. The mixture was brought to reflux (149° C.) and any water present was stripped out. The temperature was lowered to 93° C. and 300 gms of isophorone diisocyanate was added dropwise in a period of one hour. After the end of the addition, the mixture was postreacted at 93° C. until no NCO group was observed in an IR spectrum. At this point, 240 gms of PCP-0301 (polycaprolactone triol, trademark of Union Carbide) 263 gms of adipic acid, 3 gms of dibutyl tin oxide, and 215 gms of xylene were added. The mixture was heated up to 204° C. and water was distilled off until the acid number dropped below 10. The batch was then thinned with 480 parts of methyl amyl ketone. The final product had Y viscosity at 72.% NV and acid number 7.9.

EXAMPLE III

In a suitable reactor 286 gms of neopentyl glycol and 360 gms of xylene were charged. The temperature was raised to 93° C. and 360 gms of Desmondur-W (trademark of Mobay Chemical Co.) was added dropwise in a period of one hour. After the end of the addition, the mixture was postreacted at 93° C. until no NCO group was observed in an IR spectrum. At this point, 240 gms of PCP-0301 (polycaprolactone triol, trademark of Union Carbide) 263 gms of adipic acid, 3 gms of dibutyl tin oxide, and 215 gms of xylene were added. The mixture was heated up to 204° C. and water and xylene was distilled off until the acid number dropped below 10. The batch was then thinned with 480 parts of methyl amyl ketone. The final product had $Z_4$ viscosity 71.7% NV and acid number 0.8.

EXAMPLE IV

In a suitable reactor 281 gms of Esterdiol-204 (trademark of Union Carbide), 728 gms of PCP-0200 (polycaprolactone diol, trademark of Union Carbide) and 360 gms of xylene were charged. The mixture was brought to reflux (149° C.) and any water present was stripped out. The temperature was lowered to 93° C. and 360 gms of Desmondur-W (trademark of Mobay Chemical Co.) was added dropwise in a period of one hour. After the end of the addition, the mixture was postreacted at 93° C. until no NCO group was observed in an IR spectrum. At this point, 108 gms of trimethylol propane, 263 gms of adipic acid, 3 gms of dibutyltin oxide, and 200 gms of xylene were added. The mixture was heated up to 204° C. and water and xylene was distilled off until the acid number dropped below 10. The batch was then thinned with 400 parts of methyl amyl ketone. The final product had $Z_1$ viscosity at 72.7% NV and acid number 2.0.

EXAMPLE V

In a suitable reactor 562 gms of Esterdiol-204 (trademark of Union Carbide) and 360 gms of xylene were charged. The mixture was brought to reflux (149° C.) and any water present was stripped out. The temperature was lowered to 93° C. and 360 gms of Desmondur-W (trademark of Mobay Chemical Co.) was added dropwise in a period of one hour After the end of the addition, the mixture was postreacted at 93° C. until no NCO group was observed in an IR spectrum. At this point, 108 gms of trimethylol propionic acid and 108 gms of dimer acid (Empol 1016, Enery, Ind.) 3 gms of dibutyl tin oxide, and 200 gms of xylene were added. The mixture was heated up to 204° C. and water and xylene was distilled off until the acid number dropped below 10. The batch was then thinned with 400 parts of methyl amyl ketone. The final product had X+ viscosity at 69.2% NV and acid number 2.9.

EXAMPLE VI

In a suitable reactor 753 gms of Esterdiol-204 (trademark of Union Carbide) and 360 gms of xylene were charged. The mixture was brought to reflux (149° C.) and any water present was stripped out. The temperature was lowered at 93° C. and 360 gms of Desmondur W (trademark of Mobay Chemical Co.) was added dropwise in a period of one hour. After the end of the addition, the mixture was postreacted at 93° C. until no NCO group was observed in an IR spectrum. At this point, 474 gms of PCP-0301 (polycaprolactone triol, trademark of Union Carbide) 263 gms of adipic acid, 402 gms of dodecanoic acid, 4 gms of dibutyl tin oxide, and 200 gms of xylene were added. The mixture was heated up to 204° C. and water and xylene was distilled off until the acid number dropped below 10. The batch was then thinned with 480 parts of methyl amyl ketone. The final product had $Z_1$ viscosity at 70.0% NV and acid number 5.2.

EXAMPLE VII

In a suitable reactor 562 gms of Esterdiol-204 (trademark of Union Carbide) and 360 gms of xylene were charged. The mixture was brought to reflux (149° C.) and any water present was stripped out. The temperature was lowered to 93° C. and 360 gms of Desmondur W (trademark of Mobay Chemical Co.) was added dropwise in a period of one hour. After the end of the addition, the mixture was postreacted at 93° C. until no NCO group was observed in an IR spectrum. At this point, 240 gms of PCP-0301 (polycaprolactone triol, trademark of Union Carbide, New York, N.Y.) 131 gms of adipic acid and 133 gms of phthalic anhydride, 3 gms of dibutyl tin oxide, and 215 gms of xylene were added. the mixture was heated up to 204° C. and water was distilled off until the acid number dropped below 10. The batch was then thinned with 480 parts of methyl amyl ketone. The final product had $Z_5$ viscosity at 70.1 NV and acid number 3.

EXAMPLE VIII–XIII

Two component enamel coatings were formulated according to the compositions shown in Table A. The order of addition was as follows. First the resin was mixed with the flow control additive, CAB (cellulose acetate butyrate) and 2-ethyl hexyl acetate; subsequently the aluminum paste was predesolved in 15 parts of butyl cellosolve acetate and added to the mixture. After the aluminum paste was dispersed, the rest of butyl cellosolve acetate was added. To this mixture the isocyanate, predesolved in 30 parts of methyl amyl ketone, was added right before spraying the coating. The viscosity of the paint was adjusted fast to 20 sec. #4 Ford Cup (80° C.) with methyl amyl ketone. Borderite steel panels and plastic panels were sprayed and baked for 30 min. at 121° C. to give smooth, tough films with excellent flexibility and MEK resistance.

TABLE A

| Composition | Example | | | | | | |
|---|---|---|---|---|---|---|---|
| | VIII | IX | X | XI | XII | XIII | XIV |
| Resin of Example I | 198 | | | | | | |
| Resin of Example II | | 194 | | | | | |

TABLE A-continued

| Composition | VIII | IX | X | XI | XII | XIII | XIV |
|---|---|---|---|---|---|---|---|
| Resin of Example III | | 195 | | | | | |
| Resin of Example IV | | | 192 | | | | |
| Resin of Example V | | | | 202 | | | |
| Resin of Example VI | | | | | 200 | | |
| Resin of Example VIII | | | | | | | 198 |
| Flow control additive | 5 | 5 | 5 | 5 | 5 | 5 | 5 |
| Cellulose acetate butyrate[1] | 2 | 2 | 2 | 2 | 2 | 2 | 2 |
| 2-ethyl hexyl acetate | 15 | 15 | 15 | 15 | 15 | 15 | 15 |
| Aluminum paste 8199-AR[2] | 9 | 9 | 9 | 9 | 9 | 9 | 9 |
| Butyl Cellosolve acetate | 50 | 50 | 50 | 50 | 50 | 50 | 50 |
| Desmondur L-2291[3] | 75 | 75 | 75 | 75 | 75 | 75 | 75 |
| Desmondur Z-4370[3] | | | | | | 107 | |
| Methyl amyl ketone | 30 | 30 | 30 | 30 | 30 | 30 | 30 |

[1]EAB 381-01 available from Eastman Chem.
[2]Available from Silberline, Lansford, Pa.
[3]Trademark, Mobay Chemical Co., Pittsburgh, Pa.

EXAMPLE XV

A millbase was prepared by grinding in a ballmill the following mixture:

| Composition | Parts by Weight |
|---|---|
| Resin of Example I | 101 |
| Anti-Terra-V | 19 |
| Barium Surfate | 547 |
| TiO$_2$ | 103 |
| Carbon Black | 4 |
| Xylene | 150 |
| Toluene | 50 |

A two component primer coating composition was formulated by mixing the following components.

| Composition | Parts by Weight |
|---|---|
| Millbase (above) | 746 |
| Resin of Example I | 425 |
| Desmondur L-2291[1] | 150 |
| Methyl amyl ketone | 500 |

The above composition was mixed fast (within 5 min.), reduced to 18 sec. #4 Ford Cup (80° C.) and sprayed over the Bonderite steel and plastic panels. The panels were baked at 250° C. for 30 min. and gave smooth tough films with excellent MEK resistance.

While particular embodiments of the invention have been described, it will be obvious to those skilled in the art that various changes and modifications may be made without departing from the invention, and it is intended to cover in the appended claims all such modifications and equivalents as fall within the true spirit and scope of this invention.

What is claimed is:

1. A flexible two component urethane coating composition which is characterized in that it comprises:
   (A) hydroxy-containing urethane modified polyester
      (i) having a number average molecular weight ($\overline{M}_n$) of between about 1000 and about 10,000, (ii) having a hydroxyl number of between about 30 and about 200, and (iii) containing between about 1 and about 10 urethane groups per molecule, and being made from reactants comprising:
      (1) urethane modified diol made by reacting:
         (a) diol, and
         (b) diisocyanate, wherein said diol and said diisocyanate are reacted in a molar ratio of from about 4:1 to about 4:3;
      (2) polyol comprising at least about 5 weight percent triol; and
      (3) acid component selected from dicarboxylic acids and anhydrides thereof;
   (B) polyisocyanate crosslinking agent; and
   (C) 0-60 weight percent, based on the total weight of (A) and (B) of said composition, of a linear polyurethane having a number average molecular weight of between about 15,000 and about 40,000.

2. A flexible coating composition according to claim 1, wherein said hydroxy-containing urethane modified polyester has a number average molecular weight of between about 2000 and about 4000.

3. A flexible coating composition according to claim 1, wherein said hydroxy-containing urethane modified polyester has a hydroxyl number of between about 50 and about 120.

4. A flexible coating composition according to claim 1, wherein said urethane modified diol is made by reacting said diol and said diisocyanate in a molar ratio of from about 2:0.8 to about 2:1.2.

5. A flexible coating composition according to claim 1, wherein said polyol further comprises diol.

6. A flexible coating composition according to claim 5, wherein said polyol comprises about 10–80 weight percent triol and about 90–20 weight percent diol based on the weight of said polyol.

7. A flexible coating composition according to claim 5, wherein said polyol comprises diol which is an aliphatic, linear diol.

8. A flexible coating composition according to claim 1, wherein said dicarboxylic acid comprise C$_6$–C$_{12}$ aliphatic, linear dicarboxylic acids.

9. A coating composition according to claim 1, wherein said composition comprises between about 10 and about 60 weight percent of said linear polyurethane based on the total weight of (A) and (B) of said composition.

10. A coating composition according to claim 1, wherein said polyisocyanate crosslinking agent is included in said composition in an amount of from about 5 to about 60 weight percent based on the weight of said hydroxy-containing urethane modified polyester in said composition.

11. A coating composition according to claim 1, wherein said polyisocyanate crosslinking agent is a diisocyanate.

12. A coating composition according to claim 1, wherein said polyisocyanate crosslinking agent has 3 or more reactive isocyanates per molecule.

13. A coating composition according to claim 12, wherein said polyisocyanate crosslinking agent is a trimerized product of an aliphatic diisocyanate.

14. A coating composition according to claim 13, wherein said polyisocyanate crosslinking agent is a trimerized reaction product of 1,6 hexamethylene diisocyanate.

15. A coating composition according to claim 12, wherein said polyisocyanate crosslinking agent is a polyisocyanate having a biuret structure.

* * * * *